US012718077B1

(12) United States Patent
Zhen et al.

(10) Patent No.: US 12,718,077 B1
(45) Date of Patent: Aug. 25, 2026

(54) COMPRESSION OF MACHINE LEARNED MODELS

(71) Applicant: Amazon Technologies, Inc., Seattle, WA (US)

(72) Inventors: Kai Zhen, Bloomington, IN (US); Hieu Duy Nguyen, Pittsburgh, PA (US); Raviteja Chinta, San Jose, CA (US); Tariq Afzal, San Jose, CA (US); Anastasios Alexandridis, Pittsburg, PA (US); Athanasios Mouchtaris, Pittsburgh, PA (US); Ariya Rastrow, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 1102 days.

(21) Appl. No.: 17/844,210

(22) Filed: Jun. 20, 2022

(51) Int. Cl.
*G06N 3/06* (2006.01)
*G06N 3/04* (2023.01)
(Continued)

(52) U.S. Cl.
CPC ............ *G06N 3/063* (2013.01); *G06N 3/049* (2013.01); *G06N 3/08* (2013.01)

(58) Field of Classification Search
CPC ...... G06N 3/063; G06N 3/049; G06N 3/0495; G06N 3/04; G06N 3/0464; G06N 3/0475;
(Continued)

(56) References Cited

U.S. PATENT DOCUMENTS 11,263,517 B1 * 3/2022 Diamant ................ G06N 3/048
11,537,853 B1 * 12/2022 Afzal ........................ G06F 5/01
(Continued)

OTHER PUBLICATIONS

Park et al, "Centroid Neural Network With a Divergence Measure for GPDF Data Clustering", 2008, IEEE Transactions on Neural Networks, pp. 1-10. (Year: 2008).*
(Continued)

*Primary Examiner* — Paulinho E Smith
(74) *Attorney, Agent, or Firm* — K&L Gates LLP

(57) ABSTRACT

Devices and techniques are generally described for compression of machine learning models. In some examples, a first weight value $w_i$ of a machine learning model is determined. The first weight value $w_i$ may be associated with a first region comprising an interval of numbers. A first loss for the first weight value $w_i$ may be determined using a first loss function comprising a weighting term comprising a sinusoid function with an argument of $\pi\theta_r w_i$. $\theta$ may be selected such that a maximum value of the weighting term for the first region is of a format that is compatible with first machine learning accelerator. A gradient of the first loss function may be determined. A second weight value $w_i$ may be determined using the gradient and the first loss. The second weight value $w_i$ may be stored in a first memory.

20 Claims, 10 Drawing Sheets

(51) Int. Cl.
*G06N 3/049* (2023.01)
*G06N 3/063* (2023.01)
*G06N 3/08* (2023.01)

(58) Field of Classification Search
CPC ........ G06N 3/0499; G06N 3/047; G06N 3/08; G06N 3/0895; G06N 3/09; G06N 3/091; G06N 3/092; G06N 3/094; G06N 3/096; G06N 3/098; G06N 3/0985
See application file for complete search history.

(56) References Cited

U.S. PATENT DOCUMENTS

| | | | | |
|---|---|---|---|---|
| 12,131,258 | B2 * | 10/2024 | Lu | G06N 3/04 |
| 2023/0229921 | A1 * | 7/2023 | Fedorov | G06N 3/0442<br>706/25 |
| 2025/0125819 | A1 * | 4/2025 | Venkatesan | H03M 13/6577 |

OTHER PUBLICATIONS

Song et al. “DRQ: Dynamic Region-based Quantization for Deep Neural Network Acceleration”, 2020, ACM/IEEE 47th Annual International Symposium on Computer Architecture (ISCA), pp. 1010-1021. (Year: 2020).*

Nguyen et al., “Quantization Aware Training with Absolute-Cosine Regularization for Automatic Speech Recognition”, 2020, InterSpeech 2020, pp. 1-5. (Year: 2020).*

Wang et al., “Compressing Deep Networks by Neuron Agglomerative Clustering”, Oct. 23, 2020, Sensors, pp. 1-16 (Year: 2020).*

Zhen et al, “Sub-8-Bit Quantization Aware Training for 8-Bit Neural Network Accelerator with On-Device Speech Recognition”, Jun. 30, 2022, arXiv, pp. 1-5 (Year: 2022).*

Max, Joel; Quantizing for Minimum Distortion; IRE Transactions on Information Theory; 1960; pp. 7-12; vol. 6; No. 1.

Lloyd, Stuart; Least Squares Quantization in PCM; IEEE transactions on information theory; 1982; pp. 129-137, 1982; vol. 28; No. 2.

* cited by examiner

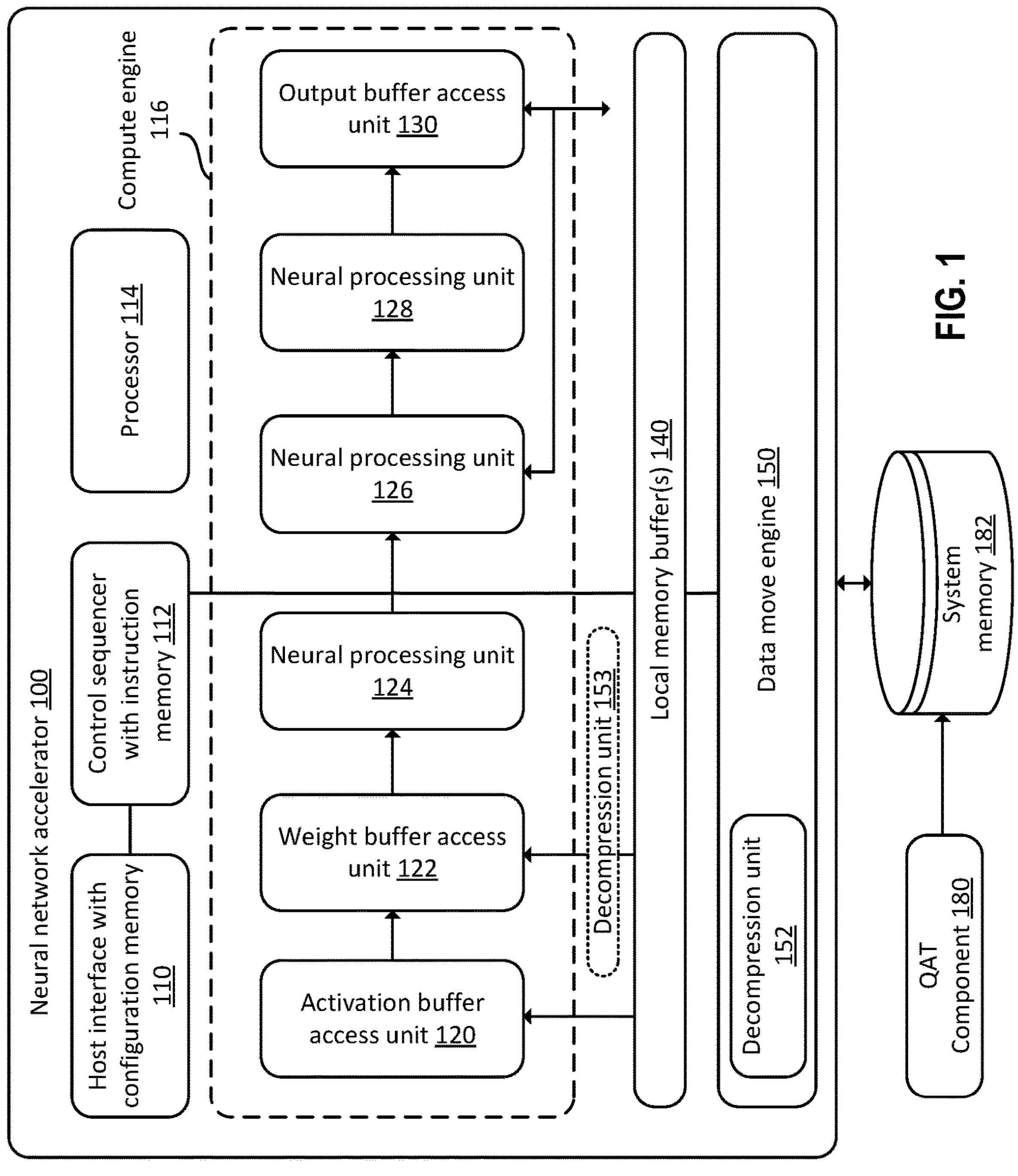
Neural network accelerator 100
Host interface with configuration memory 110
Control sequencer with instruction memory 112
Processor 114
Compute engine 116
Activation buffer access unit 120
Weight buffer access unit 122
Neural processing unit 124
Neural processing unit 126
Neural processing unit 128
Output buffer access unit 130
Decompression unit 153
Local memory buffer(s) 140
Data move engine 150
Decompression unit 152
System memory 182
QAT Component 180
FIG. 1

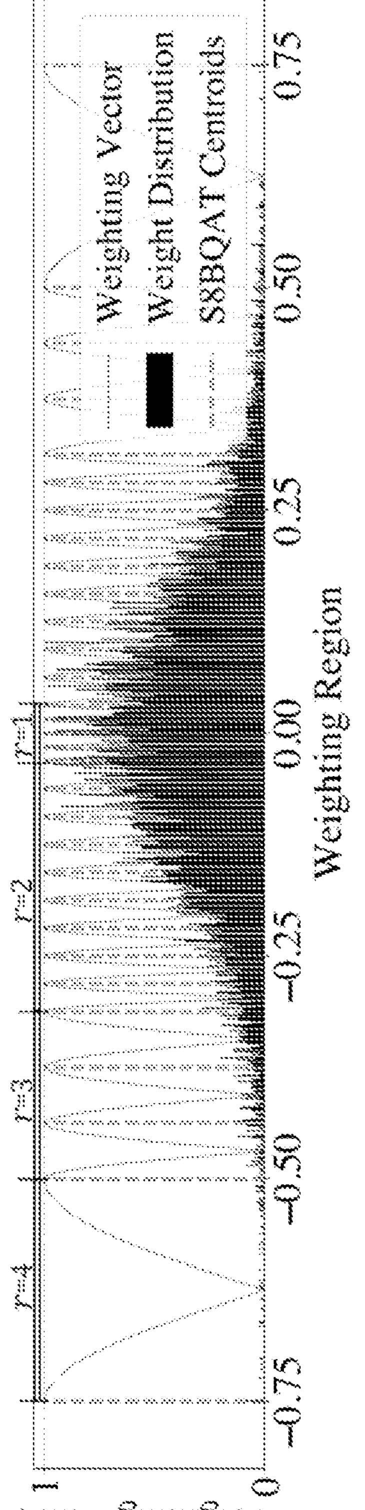
FIG. 2C Multi-regional absolute cosine regularizer with 31 peaks
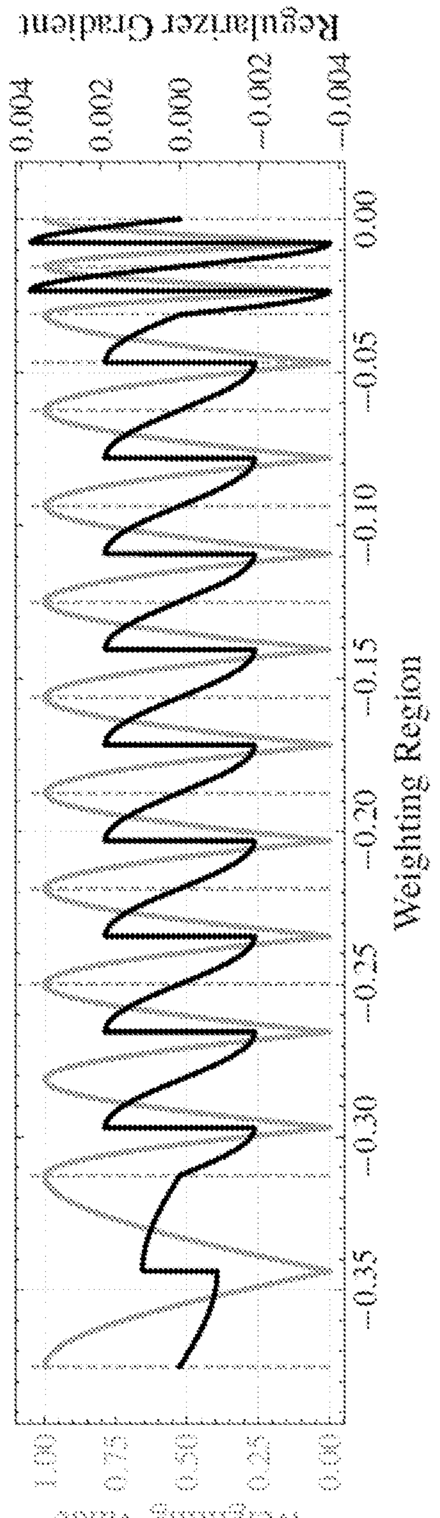
FIG. 2D Gradient decays when the cosine frequency gets smaller

| | Model Specification | | Normalized ASR WERs | | | | | | | | Normalized User Perceived Latency | | | |
|---|---|---|---|---|---|---|---|---|---|---|---|---|---|---|
| | #Param | Quantization Mode | Frequent | | Entertainment | | Appliances | | Rare | | | | | |
| | | | WER | Rel. Dgrd. | WER | Rel. Dgrd. | WER | Rel. Dgrd. | WER | Rel. Dgrd. | P50 | Rel. Dgrd. | P90 | Rel. Dgrd. |
| M-I | 61.0M | 8-bit | 1.00 | - | 2.09 | - | 2.24 | - | 3.24 | - | 1.00 | - | 1.48 | - |
| M-II | 67.3M | 8/5-bit | 0.84 | -0.16 | 1.93 | -0.08 | 2.14 | -0.04 | 3.10 | -0.04 | 0.95 | -0.05 | 1.43 | -0.03 |
| M-III | 67.3M | 5-bit | 0.84 | -0.16 | 1.94 | -0.07 | 2.13 | -0.05 | 3.12 | -0.04 | 0.93 | -0.07 | 1.41 | -0.05 |

FIG. 4

COMPRESSION OF MACHINE LEARNED MODELS

BACKGROUND

Machine learning techniques are used to form predictions, solve problems, recognize objects in image data for classification, etc. For example, machine learning techniques may be used to detect objects represented in image data and/or translate text from one human understandable language to another. In various examples, machine learning models may be improved over time by retraining the models as more or different data becomes available. Accordingly, machine learning techniques are adaptive to changing conditions. Deep learning algorithms, such as neural networks, are sometimes used to detect patterns in data and/or perform tasks.

BRIEF DESCRIPTION OF DRAWINGS

FIG. 1 is a block diagram of an example machine learning accelerator architecture effective to use compressed model parameters, according to various embodiments of the present disclosure.

FIG. 2C depicts an example weight distribution for a multi-regional absolute cosine regularizer in accordance with various aspects of the present disclosure.

FIG. 2D depicts an example of gradient decay of the multi-regional absolute cosine regularizer as cosine frequency diminishes, in accordance with various aspects of the present disclosure.

FIG. 4 depicts a table illustrating an accuracy and latency comparison for an automatic speech recognition task using 8-bit quantization and sub-8-bit quantization aware training in accordance with various aspects of the present disclosure.

DETAILED DESCRIPTION

Figure 2A:
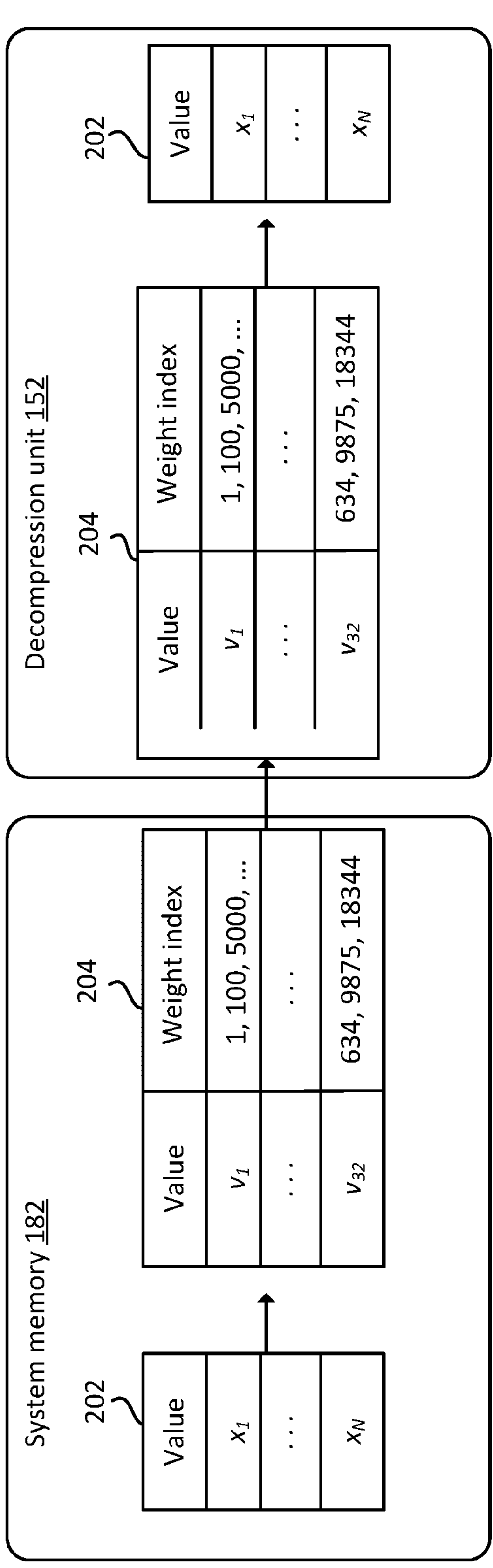
FIG. 2A depicts example data moving example between system memory and a neural network accelerator architecture, according to various embodiments of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Neural networks and other machine learning models are currently being developed for a wide variety of use cases, such as image and speech recognition. Such machine learning models can be executed on general purpose processors using program code written in a specialized programming language such as TensorFlow. The program code is converted into machine instructions by a compiler. In a neural network, the types of computations performed, and the data the computations are performed on, are very different from that used for other things. For example, neural networks generally involve repeated manipulation of large quantities of data in the form of activation values and weight values. Weight values (and bias values) are the learnable parameters of machine learning models. As used herein, weight values refer to both model weights and bias values. Activation values represent the weighted sum of the inputs for a given node of the machine learning model (which may be modified by bias terms and/or using an activation function). Because the amount of data is large, supplying this data to a computing system that executes a neural network requires that the computing system have a corresponding large memory in which the data can be stored, as well as sufficient bandwidth to transmit the data between components of the computing system or between the computing system and external devices. This causes a relative demand in terms of the hardware requirements and power consumption of the computing system.

In various examples discussed herein, a neural network accelerator (NNA) architecture is described. The NNA may include a pipeline for decompressing data operated on by a neural network. Decompression may be used to increase the amount of data into a format that can be used by the hardware and/or the software of a system. For example, data may be decompressed from a 5-bit representation to an 8-bit representation for use by 8-bit compatible hardware and/or software. Additionally or alternatively, the NNA may include a compression pipeline for compressing data generated by the neural network. Compression may be used to reduce the amount of data, and thus the bandwidth utilized, when writing data to a memory of the NNA, e.g., data from a source location in system memory. In certain embodiments, the decompression and/or compression pipeline can be implemented based on compression schemes specifically designed to take advantage of the characteristics of neural network data.

For example, model weights may be loaded from system memory to local NNA memory each time a particular model is executed due to memory constraints of the local NNA memory. Some latency is incurred each time the model parameters are loaded from system memory to a data structure in the local NNA memory. For some uses cases, the latency may be significant, such as those where a model is executed many times to perform a task. For example, in automatic speech recognition (ASR) an ASR model may be executed for each frame of audio received as part of input audio data (e.g., for a 30 frames-per-second framerate, the ASR model may be executed 30 times for a 1 second audio clip) in order to generate a predicted ASR output (e.g., text representing speech in the audio). Accordingly, the latency can be increased when the model is executed a large number of times, such as when each execution requires the model weights to be retrieved from system memory. The latency can be directly associated with the size of model weights when stored in memory and loaded from system memory to the NNA memory (e.g., the size in terms of the number of bits used to store each model weight). In some cases, lossy compression of model parameters may result in model performance degradation. As such, quantization aware training (QAT) techniques may be used to learn model parameters in a compressed, quantized state. However, some QAT training techniques may produce resulting quantized model weights that may not be compatible with the data format required by the NNA. For example, an NNA architecture may take 8-bit model weights as input, so compression to sub-8 bit model weights using may result in incompatible model parameters that may not be expressed in an 8-bit format without performance degradation and/or some additional processing.

Described herein are, among other things, examples of sub-8-bit quantization-aware training systems and techniques for NNA and/or other machine learning accelerator hardware. The various systems and techniques described herein may include compressing model weights to forms (e.g., sub-8-bit forms or other desired forms) that are also compatible with the data format accepted by the accelerator hardware (e.g., INT8 format). For a given number of model parameters, the compression techniques described herein may result in more compact machine learning model size (measured in bits of data) and less latency (measured in time) when loading the machine learning models from system memory and/or from back-end or other type of training components to devices on which the trained machine learning models are executed to perform runtime inferences. As used herein, back-end systems and/or devices may include servers deployed in data centers, desk top computing devices, lap tops, virtual assistant devices, tablets, and/or other devices with integrated processing capability and/or computer-readable memory. Additionally, storing and/or executing machine learning model parameters of reduced size may result in savings in terms of storage of such parameters, transmission of such parameters, and/or processing using such parameters regardless of the devices using such parameters (e.g., regardless of whether the parameters are deployed on "back end" systems in data centers or on local user devices). Further, the compression techniques enable models to be stored and/or executed on compute-resource constrained devices (such as end-user devices and other "edge" devices). In addition, the compression techniques described herein have shown improved predictive capability relative to uncompressed models. Accordingly, larger models (in terms of data, as measured, e.g., by a number of model weights and/or storage memory size) may be employed at a given memory budget while improving predictive performance. In addition to the above-described advantages of compressed machine learning models, smaller machine learning models can also have lower carbon footprints associated with their execution. In general, the compression techniques described herein may be used to compress machine learning models regardless of what type of device the models are deployed on.

Although various examples of compression of machine learning models used in the context of natural language processing are described herein, such examples are merely for illustrative purposes. The various techniques described herein may be used to compress any machine learning models using learned model weights, regardless of the uses to which such models are put.

FIG. 1 is a simplified block diagram of an NNA 100 according to various aspects of the present disclosure. The NNA 100 comprises a host interface 110, a control sequencer 112, an optional processor 114, an activation buffer access unit 120, a weight buffer access unit 122, a plurality of neural processing units (NPUs) 124, 126, and 128, an output buffer access unit 130, a set of local memory buffers 140, and a data move engine (DME) 150. The activation buffer access unit 120, the weight buffer access unit 122, the NPUs 124, 126, and 128, and the output buffer access unit 130 collectively form a compute engine 116. Along with the control sequencer 112 and the DME 150, the compute engine 116 is responsible for executing instructions.

The NNA 100 can be implemented as a standalone computing system or, as shown in FIG. 1, as part of a computing system comprising a host processor and system memory 182. The NNA 100 depicted in FIG. 1 is merely an example and is not intended to unduly limit the scope of claimed embodiments. One of ordinary skill in the art would recognize many possible variations, alternatives, and modifications. For example, in some implementations, NNA 100 may have more or fewer components than those shown in FIG. 1, may combine two or more components, or may have a different configuration or arrangement of components. The NNA 100 generally executes one set of instructions at a time. This set of instructions is referred to herein as a "context." At runtime, the NNA 100 sequences and dispatches, using control sequencer 112, instructions from a pre-compiled context for execution. In certain embodiments, each context comprises a set of instructions that ends with a HALT instruction. Contexts are created by a software compiler. The instructions within a context can implement at least part of a neural network. For example, a context can correspond to a complete layer, a partial layer, or multiple layers of the neural network. In some instances, a context can correspond to a complete neural network (e.g., with instructions for an input layer, a hidden layer, and an output layer).

The host interface 110 is a communication interface to the host processor (not depicted) of the local computing system. The local computing system includes system memory for storing data operated on by the NNA (e.g., weights, activations, and output values corresponding to inferences). The NNA 100 may be communicatively coupled to multiple hosts simultaneously, with any one of the hosts being able to program the NNA 100 to execute neural network-related tasks on behalf of the host. The host interface 110 can communicate with the host processor via a standard communication protocol such as, for example, Advanced extensible Interface (AXI) protocol. Similarly, the NNA 100 can include a separate communication interface for communicating with the system memory, e.g., to read and write data from the local memory buffers 140 to the system memory 182. The communication interface to the system memory 182 is, in certain embodiments, integrated into the DME 150. Thus, the DME 150 can also include an AXI interface.

The control sequencer 112 is responsible for sequencing, dispatching, and finishing execution of instructions. Some instructions are executed entirely in the control sequencer 112. Other instructions may be dispatched to one or more of the NPUs 124, 126, and 128 for execution, possibly with execution results being returned to the control sequencer 112 for further processing. Still other instructions are executed by the DME 150 to move data to and from the local memory buffers 140. More than one instruction can be in the execution phase at any given time within the NNA 100. The control sequencer 112 can include an instruction memory into which instructions to be executed by the NNA 100 are downloaded from the host processor or loaded from the system memory. In the example of FIG. 1, the host interface 110 includes a configuration memory. The configuration memory may include one or more registers that are configurable by the host processor to specify parameters relating to the context to be executed, e.g., various context dependent parameter registers (CDPRs).

In certain embodiments, the configuration memory includes a predicate register for synchronizing execution of instructions. Instructions are broadcast by the control sequencer 112 to each component of the compute engine 116 as well as the local memory buffers 140 and the DME 150. Upon receipt of a broadcast instruction, a component may proceed to execute at least part of the instruction in response to determining that the component is capable of handling the instruction. For example, the DME 150 could receive and execute a data move instruction, but the NPUs 124, 126, and 128 could ignore the data move instruction. Because instructions can execute concurrently in different components, it is useful to have a synchronization mechanism to handle any dependencies between instructions. The predicate register can be used to implement such a synchronization mechanism and, in certain embodiments, is a global register visible to internal components of the NNA 100, as well as visible to external entities such as the host processor. Synchronization also helps to prevent conflicts in accessing the local memory buffers 140.

The processor 114 is an optional general purpose processor for performing certain types of processing in parallel with processing performed by the NPUs 124, 126, and 128. For example, processor 114 may include a floating point unit or other arithmetic logic unit for performing general arithmetic operations in parallel with matrix operations performed by the NPUs 124, 126, and 128.

The activation buffer access unit 120 is configured to access one or more activation buffers in the local memory buffers 140. Similarly, the weight buffer access unit 122 and the output buffer access unit 130 are configured to access one or more weight buffers and one or more output buffers, respectively. The activations stored in the activation buffer(s) correspond to activations produced by one or more layers of a neural network being executed on the NNA 100. The weights stored in the weight buffer(s) are synaptic weights associated with edges between a node of one layer and a node of another layer. Activation and weights are used for certain computations, including for instructions executed by the compute engine 116. The output buffers can store final results or intermediate results (e.g., partial sums) for access by the host processor or the system memory 182. The NPUs 124, 126, and 128 perform numerical operations using the activations and weights stored in the local memory buffers 140. Each NPU is configured to perform all or part of a compute instruction. Although FIG. 1 depicts the NPUs 124, 126, and 128 as block components, the NPUs 124, 126, and 128 are not necessarily identical. For example, as described in connection with FIG. 2A, the operations of one NPU may differ from the operations performed by another NPU.

The DME 150 is used to bidirectionally move instructions and data between the system memory and NNA local memories (e.g., the activation, the weight, and output buffers that form the local memory buffers 140). The DME 150 can receive data move instructions (e.g., LOAD and STORE instructions) from the control sequencer 112 when such instructions are broadcast. The data move instructions executed by DME 150 can execute concurrently with compute instructions executed by the control sequencer 112 or the compute engine 116.

As shown in FIG. 1, the DME 150 includes a decompression unit 152 that may be used to decompress weight data received from system memory 182 and compressed using the quantization aware training techniques discussed herein. In various examples, quantization aware training (QAT) component 180 may perform the various compression techniques described herein to compress weight values (and/or other stored data) into smaller representations. In various examples, the weights from system memory 182 may be decompressed into a format (e.g., 8-bit integer ("INT8")) that is compatible with the neural network accelerator 100. In various examples, the location of the decompression unit 152 can vary. For example, in another embodiment, the decompression unit 152 (e.g., "in-line" decompression) can be part of the compute engine 116 and is configured to decompress data stored in the local memory buffers 140 for input of the decompressed data to one or more of the NPUs 124, 126, and 128. Optionally, on-the-fly decompression may be used (e.g., by optional decompression unit 153) to decompress weight values in local memory buffer(s) 140 when loading weight values into weight buffer access unit 122.

Figure 3:
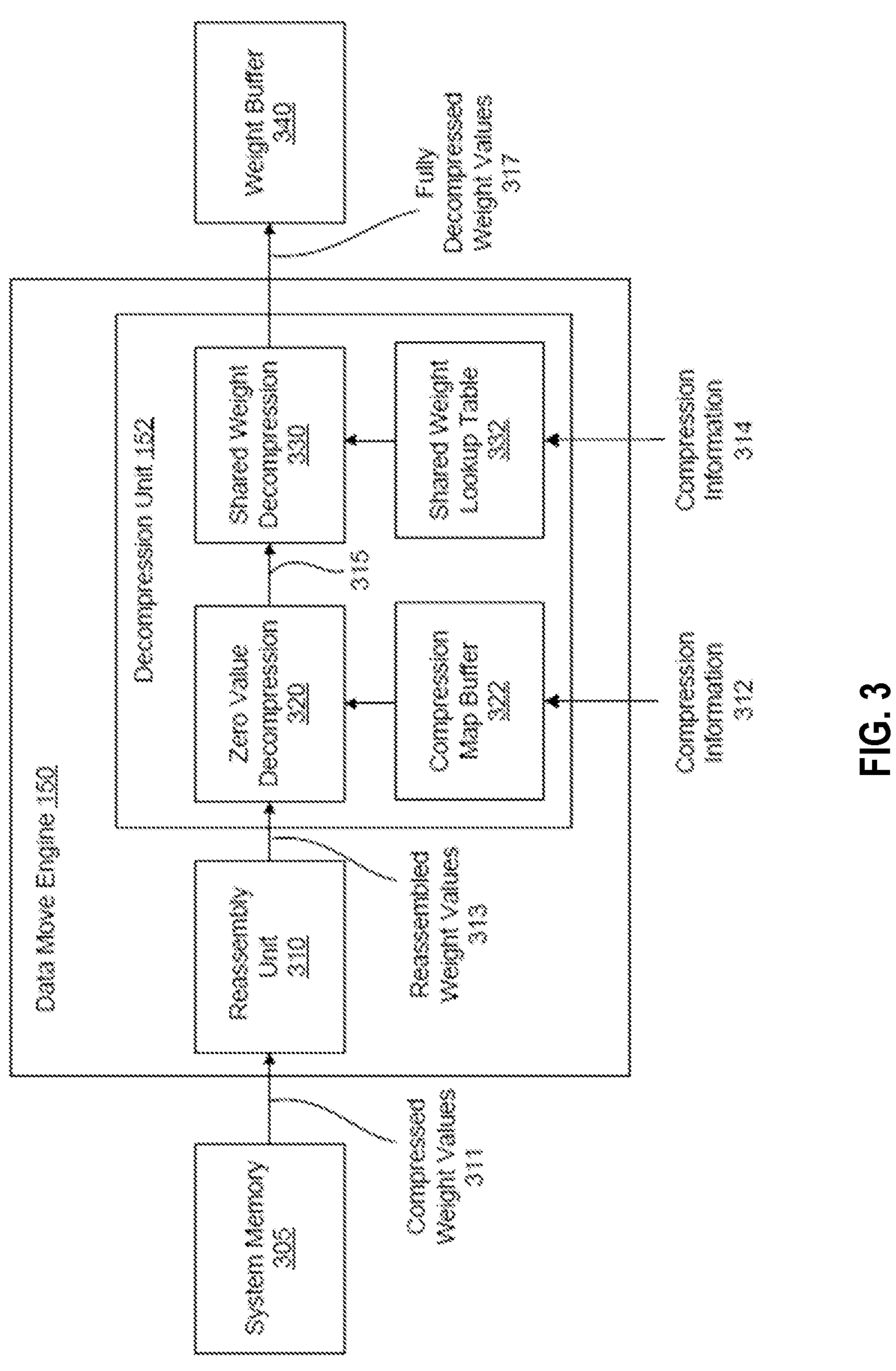
FIG. 3 depicts an example decompression unit of a neural network accelerator, in accordance with various aspects of the present disclosure.

The decompression unit 152 implements a decompression pipeline. An example of a decompression pipeline is shown in FIG. 3. The decompression pipeline of the decompression unit 152 involves processing using one or more decompression schemes. The decompression unit 152 can select between using one decompression scheme alone or using multiple decompression schemes in combination. For example, the decompression unit 152 may decompress data using zero value decompression and then further decompress the data using shared value decompression. In the example of zero value plus shared value decompression, the order in which the compression schemes are applied can vary depending on how the decompression unit 152 is implemented. Thus, zero value decompression could be performed first followed by shared value decompression. Alternatively, shared value decompression could be performed first. In general, the order in which zero value decompression and shared value decompression are performed does not matter as the resulting decompressed data would be the same irrespective of which decompression scheme is applied first.

Although the example embodiments are described in connection with zero value compression/decompression and shared value compression/decompression, other techniques for compressing and decompressing data can be implemented. These are merely two examples of compression/decompression schemes that are suitable for use with the types of data involved in neural networks.

In the example of FIG. 1, the decompression unit 152 may be configured to receive compressed data from the system memory 182 and decompress the compressed data, using one or more decompression schemes, to generate decompressed data for storage in the local memory buffers. Alternatively, in certain embodiments, the decompression unit 152 may be configured to receive compressed data from the local memory buffers and decompress the compressed data for use by a processing component of the NNA 100 (e.g., one of the NPUs 124, 126, and 128, or the control sequencer 112). Thus, the data may be stored in either compressed or decompress form within the local memory buffers 140. Irrespective of how the data is stored in the local memory buffers 140, the data may be sent from the system memory to the NNA 100 in compressed form. Sending the data to the NNA in compressed form reduces the amount of time required to send the data.

The local memory buffers 140 are used to abstract the physical implementation of memories that form the activation, weight, and output buffers from NNA components (e.g., the compute engine 116 and the DME 150) that access data in these buffers. The data in the activation, weight, and output buffers is accessed through addressing the buffers individually, with the buffer addresses being mapped to the physical addresses of the memories where the data is stored. In certain embodiments, the memories of the local memory buffers 140 are implemented as static random-access memory (SRAM) devices. However, the local memory buffers 140 can be implemented using other types of memory, both volatile and non-volatile (e.g., flash memory, DRAM, resistive RAMs, and the like). As mentioned above, the data in be stored in the local memory buffers 140 in compressed or decompressed form.

The NPUs 124, 126, and 128 perform numerical operations using the activations and weights stored in the local memory buffers 140. Each NPU is configured to perform all or part of a compute instruction. The compute instruction may, for example, implement at least some of the computation described earlier in connection with processing by a node of a neural network, i.e., computing a weighted sum of input activations multiplied by weights, adding a bias value to the weighted sum, and then applying an activation function. Other types of computations may also be performed by the NPUs 124, 126, and 128. For example, identifying the minimum and maximum values among a first set of data values represented by a first vector and a second set of data values represented by a second vector, performing an extended multiply add, subtracting two vectors, and other types of operations applicable to data from a vector or matrix may be performed.

FIG. 2A depicts example data moving example between system memory and a neural network accelerator architecture, according to various embodiments of the present disclosure. Many examples of NNA hardware chipsets use an accompanied compressing mechanism (ACM) to compress model weights. Each deep learning model layer is associated with a set of weights. For example, various current NNA architectures process weights using an 8-bit (INT8) format. However, it is possible to compress the model weights so that less bandwidth is used when transferring model weights from system memory 182 to the NNA 100.

FIG. 2A depicts an example wherein original weight values 202 are compressed (e.g., from 8-bits each to 5-bits each) prior to transferring the weights to the decompression unit 152 of the NNA 100. 5-bit weights use 37.5% less time to transfer relative to 8-bit weights (⅜=37.5%). Additionally, model latency is reduced (model latency=weight transferring time+computation time). As shown, the original weight values 202 (e.g., 8-bit weight values) may be compressed using the various techniques described herein to generate the value-index table 204, where each weight index is mapped to one of 32 quantized weight values (as $2^5=32$). The value-index table 204 is substantially smaller (in terms of an amount of available memory required to store the value-index table 204) than the original weight values 202. Accordingly, the value-index table 204 may be loaded from system memory 182 to the local memory of the NNA 100 and may be decompressed back to the original 8-bit values by decompression unit 152. Various example operations of decompression unit 152 are described below in reference to FIG. 3.

Figure 2B:
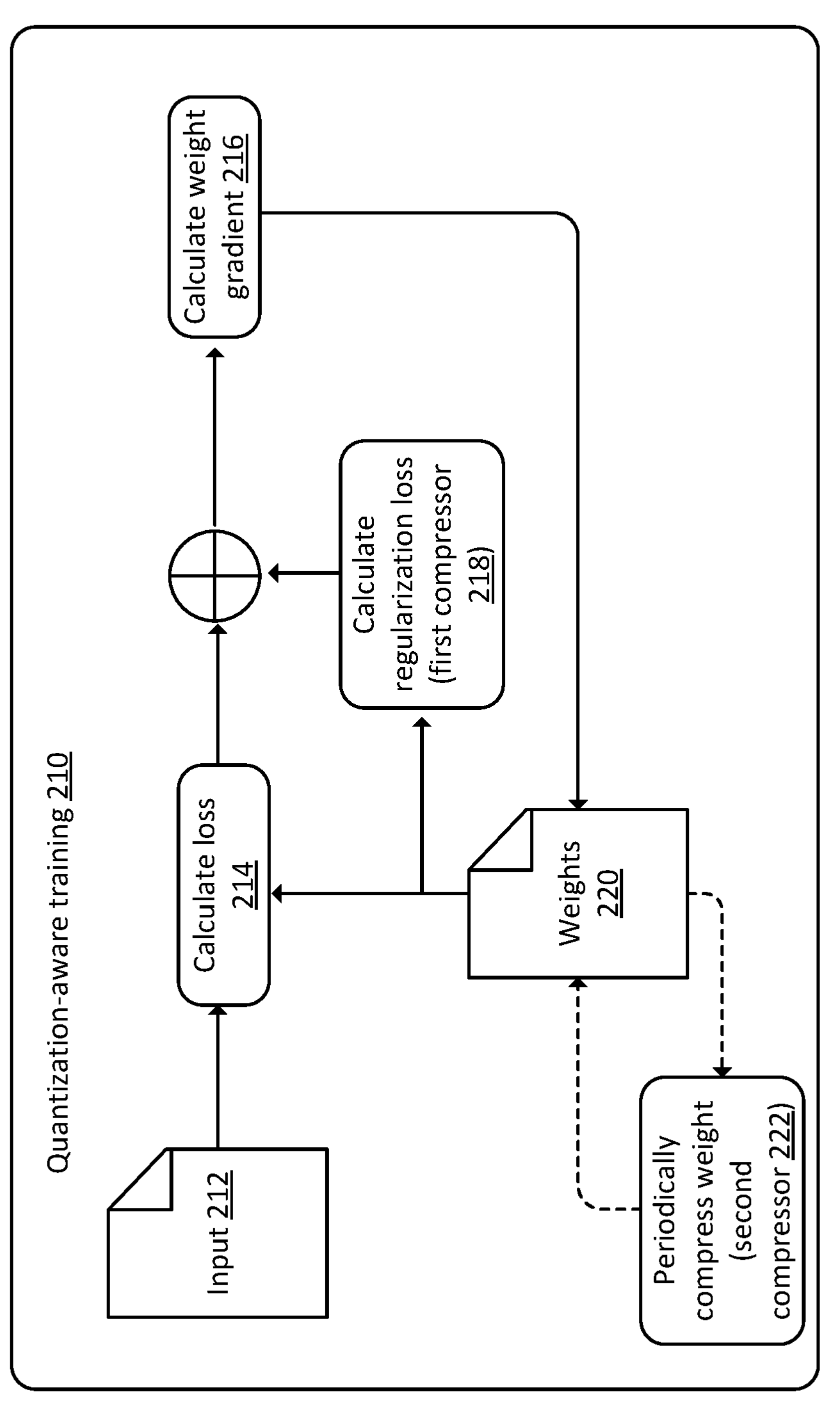
FIG. 2B depicts an example of quantization-aware training that may be used to compress machine learning model weights in accordance with various aspects of the present disclosure.

FIG. 2B depicts an example of quantization-aware training that may be used to compress machine learning model weights in accordance with various aspects of the present disclosure. Efficient neural network inference can be approached by various ways. For example, the teacher-student training paradigm for knowledge distillation simplifies the network topology, although the student network may fail to mimic the teacher's behavior if the model capacity is too low. Furthermore, it usually requires applying additional network compression techniques prior to the final hardware deployment. As an alternative approach, enforcing model sparsity can significantly reduce memory footprint. However, inference speedup may only be realized if the sparsity pattern matches the specific memory design of the hardware.

Neural network quantization can be effectively employed to compress 32-bit weights (or other formats) down to 8-bit, via applying a simple post-training quantization step or a more involved QAT mechanism. Several quantization methods have been proposed to lower the bit-depth to 4 or less. Nevertheless, such methods are typically heuristic and rely on extensive hyper-parameter tuning to maintain the accuracy level. Furthermore, such sub-8-bit quantization methods require sub-8-bit operators on neural network accelerators (NNAs), which often have inferior performance compared to their 8-bit counterpart due to the reduced numerical accuracy. Consequently, sub-8-bit NNAs are less adopted and thus there is no real latency measurement for existing sub-8-bit approaches. The most prevalent type of NNAs are based on 8-bit arithmetic operators, i.e. addition/multiplication/etc., accepting 8-bit inputs and computing the outputs via bitwise operations. Such NNAs may be referred to as INT8 NNAs.

Described herein and illustrated in FIG. 2B are proposed techniques for sub-8-bit quantization aware training (S8BQAT) that integrates with INT8-based runtime NNAs (such as NNA 100 of FIG. 1). S8BQAT distills quantization centroids (e.g., centroid values) from a pre-trained 32-bit baseline via a mechanism derived from Lloyd-Max scalar quantization theory. A Multi-Regional Absolute Cosine (MRACos) regularizer (e.g., the "soft compressor" of FIG. 2B) that is INT8 compatible and computationally efficient is introduced.

The MRACos regularizer penalizes off-the-centroid weights during training and aggregates weights towards their nearest quantization centroid values. In other words, the learned weight values are modified during training. The MRACos regularizer introduces a regularization loss term during training. This regularization loss increases the further the current weight value is from a quantization centroid value. Similarly, the regularization loss is smaller when the current weight value is close to the quantization centroid value. During training the weight values are thus modified to be closer and closer to the quantization centroids (e.g., using gradient descent to change the weight values in order to minimize the loss). The quantization centroid values are values that can be compressed into the target number of bits. Additionally, using the particular MRACos regularizer described below, a frequency term θ ensures that the quantization centroids can be well expressed in the desired number of bits after decompression (e.g., in INT8 format). Additionally, the MRACos regularizer is accompanied by a periodic compressor that assigns each model weight to that nearest quantization centroid, ensuring quantization convergence on INT8 compatible values and therefore minimizing runtime quantization-induced performance degradation. The MRACos regularizer and periodic compressor are referred to herein as a "soft compressor" and "hard compressor," respectively (e.g., first compressor 218 and second compressor 222). The first compressor 218 affects the gradient calculation only through the use of the regularization term, while the second compressor 222 quantizes each model weight to the exact centroid that are also used at runtime inference (ensuring convergence to a nearest centroid value). In other words, while the regularization term of the first compressor 218 forces the model weights to approach the centroid values, there is no guarantee that the model weights will converge to a centroid value during training. Accordingly, the second compressor 222 is used to update the model weights by replacing the model weight with the value of the centroid closest to the model weight. The "closest" or "nearest" centroid value may be determined based on the magnitude of the difference between the current weight value and each of the centroid values. The centroid value associated with the smallest magnitude of difference between the current weight value and the centroid value is the nearest/closest centroid value. Empirical testing of QAT 210 (e.g., sub-8-bit QAT) on the ASR task (e.g., automatically transcribing human speech into text or other ASR outputs) is described herein. Performance of S8BQAT 210 is measured in terms of word error rate (WER) and on-device runtime user-perceived latency (UPL) on various runtime settings. Results show that the proposed S8BQAT 210 achieves superior WER-UPL tradeoff compared to an 8-bit baseline. In particular, in one example, SBQAT 210 was used to increase the number of model parameters by 10.3%, resulting in a reduction in WER by 4-16% while reducing UPL by 5%.

SBQAT 210 compresses deep learning models that are hosted on an NNA. At runtime, the NNA loads the model weights from the system memory into the neural computing unit's local memory buffer 140 (data moving phase) to perform bitwise arithmetic operations. This data moving phase is used for each model inference call as often NNAs have limited on-chip memory to fully cache model weights locally.

High efficiency can be achieved by accelerating matrix related operations, such as matrix multiplication on NNAs. Yet, the data moving phase is time consuming due to the constrained available memory bandwidth on-device. To reduce the bandwidth and consequently the latency, model weights are quantized into sub-8-bit (offline quantization) format, then transfer the quantized weights to the NNA's neural computing unit where sub-8-bit weights are decompressed into INT8 format for the neural processing phase (FIG. 2A). Consider a weight matrix with the shape of (1024; 4096). With Lloyd-Max quantizer representing all weights by 32 distinct values or 5-bit, the compressed matrix requires 2.5 MB, instead of 4 MB for 8-bit, thus reducing the in-memory size and data transfer latency by 37.5%.

Lloyd-Max Scalar Quantization

The problem of compressing a set of weights into another set with a smaller cardinality is solved by S. Lloyd and J. Max, which is often referred to as Lloyd-Max scalar quantization theorem (Stuart Lloyd, "Least Squares Quantization in PCM," *IEEE transactions on information theory*, vol. 28, no. 2, pp. 129-137, 1982; Joel Max, "Quantizing for Minimum Distortion," *IRE Transactions on Information Theory*, vol. 6, no. 1, pp. 7-12, 1960).

Let $\{c_1, \ldots, c_k\}$ be k partitions of the model weights $w=\{w_1, \ldots, w_n\}$, and $\{m_1, \ldots, m_k\}$ be the prototypes (or quantization centroids) for the corresponding k partitions. Lloyd Max algorithm minimizes the mean squared error between the model weights and corresponding centroids:

$$\mathcal{H} = \sum_{k=1}^{K} \sum_{w_i \in c_k} \|w_i - m_k\|^2.$$

The solutions of $\{m_1, \ldots, m_k\}$ can be derived in closed-form, or via an iterative method which is also used for K-Means clustering: for each iteration, 1) each $w_i$ is assigned to the nearest $$m_k : c_k^{new} = \left\{ w_i : \underset{k'}{\text{argmin}} \|w_i - m_k\|^2 = k \right\};$$

and 2) update prototypes by setting $$m_k^{new} = \frac{1}{|c_k^{new}|} \sum_{w_i \in c_k^{new}} w_i,$$

where both steps decrease $\mathcal{H}$ unless the algorithm has converged. With all weights $w \in c_i$ represented by $\{m_1, \ldots, m_k\}$, the weights are quantized into $\lceil \log_2 k \rceil$ bits.

Lloyd-Max Quantizer-Like Regularization

Directly applying the Lloyd-Max scalar quantizer to sub-8-bit QAT may present challenges. First, the quantization centroids are not guaranteed to conform to INT8 format. Consequently, at runtime, when the quantization centroids are updated to k/128 (i.e., INT8 format), where the integer $k \in [-128, 127]$, the model performance is subject to degradation. Second, executing the Lloyd-Max algorithm per training step is computationally expensive and memory consuming.

Accordingly, a multi-regional absolute cosine (MRACos) regularizer (first compressor 218) may be used.

$$\mathcal{L}_{MRACos-reg}(w) = \sum_{w_i \in w} \sum_{r=1}^{R} \delta_r \lambda_r (1 - |\cos(\pi \theta_r w_i)|), \tag{1}$$

where $|\cos(\pi\theta_r w_i)|$, $\lambda_r$, and $\theta_r$ define the weighting term, regularization weight coefficient, and frequency of the cosine function in region r, respectively. $\delta_r(w_i)=1$ for all $w_i \in w$ that are inside the range of the r-th region, and $\delta_r(w_i)=0$ otherwise. As shown in FIG. 2C, the MRACos regularizer approximates the Lloyd-Max quantization centroids per region, e.g. r=3. The cosine function (or other sinusoidal function depending on the implementation) approximates the location of the prototype quantization centroids of the Lloyd-Max quantizer ($m_k$). If the weight value $w_i$ is on a centroid, the resulting penalty (regularization loss) is zero.

Note that the frequency θ of the cosine function for all regions in Eq. 1 is selected such that regularizer maxima have INT8 format k/128, in which $k \in [-128; 127]$, and closest to the Lloyd-Max quantizer. In other words, θ is selected such that $\theta=2^n$, where $n \in [1, 2, 3, 4, 5, 6, 7, 8]$ in order to conform to INT8 format. The weighting term $|\cos(\pi\theta_r w_i)|$ penalizes model weights by how far the model weights are off from the nearest centroid. As shown in Eq. 1 and in FIG. 2D, the further the model weight is off from the centroid, the larger penalty is applied. The weight receives no penalty when the weight is on the centroid value (e.g., when the weighting term has a maximum magnitude), as it leads to no extra degradation when being quantized. Weights outside all regions are clipped.

The gradient of MRACos regularizer can be calculated as $$\frac{\partial \mathcal{L}_{MRACos-reg}}{\partial w_i} = \sum_{r=1}^{R} \theta_r \lambda_r (-1)^{\xi} \pi \delta_r \sin(\pi \theta_r w_i) \tag{2}$$

in which $$\xi = 0 \text{ if } w \in \left[\frac{t-2}{\theta_r}, \frac{t}{\theta_r}\right] \text{ with } t = \{\ \ldots\ , -3, -1, 1, 3, \ldots\ \} \text{ and } \xi = 1,$$

otherwise. Note that the cosine frequency $\theta_r$ in Eq. 2 becomes a decay factor in the gradient of the regularizer. For a region with a relatively small cosine frequency, the gradient in that region is comparably small (see FIG. 2D). With a relatively large $\lambda_r$, weights will be more aggressively aggregated toward quantization centroids for faster quantization convergence. However, setting a high regularization weight may negatively affect the model performance.

In FIG. 2B, for a given input 212 to the model the loss is calculated (loss 214) according to a loss function designed for the model (e.g., L1 loss, L2 loss). During an iteration, the weight gradient is calculated using Eq. 2 and the weights 220 may be updated. During the next iteration, the regularization loss for the current weight values may be determined using Eq. 1 (e.g., the first ("soft") compressor 218) and the regularization loss may be added to the loss 214. However, even after a suitable number of training iterations, there is no guarantee that the weights 220 will be compatible with INT8 format as the weights 220 may not have converged to the centroid values. Accordingly, second compressor 222 may be used to periodically conform the weights 220 to the centroid values (e.g., once in a threshold number of training epochs (every τ epochs, where τ is a tunable parameter)).

Instead of increasing the regularization weight to address the gradient decay issue, the periodic second compressor 222 may perform runtime quantization during model training per t epochs (as shown in FIG. 2B). The quantization convergence rate of weights may be measured for the k-th partition $c_k$, and its centroid $m_k$ as $$\gamma_k = \frac{\left|\|w_i - m_k\|^2 < \epsilon\right|}{|w_i \in c_k|} \tag{3}$$

where the threshold is tunable and may be relatively small.

FIG. 3 illustrates an example decompression pipeline, according to certain embodiments. In the example of FIG. 3, the decompression pipeline is implemented using the decompression unit 152 within the DME 150 of FIG. 1 and involves decompression of compressed weight values 311 (e.g., weight values compressed using S8BQAT as described above). However, the techniques described with respect to FIG. 3 can be applied to decompression units located elsewhere in the NNA, as well as to other types of neural network data including, but not limited to, activations.

As shown in FIG. 3, the compressed weight values 311 are loaded from a system memory 305 into a reassembly unit 310 of the DME 150. The reassembly unit 310 is configured to read and assemble the compressed weight values 311. For example, the compressed weight values 311 may correspond to values from a two-dimensional weight matrix, with the matrix values being transmitted from the system memory 305 in a certain order (e.g., row-by-row, column-by-column, multiple rows at a time, or multiple columns at a time). The reassembly unit 310 can rearrange and combine the compressed weight values 311 as appropriate for consumption by the decompression unit 152, to generate reassembled weight values 313 that have yet to be decompressed.

The decompression unit 152 includes, in this example, a zero value decompression unit 320 and a shared weight decompression unit 330. In certain embodiments, the zero value decompression unit 320 and the shared weight decompression unit 330 are implemented in hardware. However, implementation in software or a combination of hardware and software are also possible. The zero value decompression unit 320 applies a zero value decompression scheme to the reassembled weight values 313, thereby generating partially decompressed weight values 315 for input to the shared weight decompression unit 330.

The zero value decompression unit 320 may perform the decompression of the reassembled weight values 313 based on compression information 312 contained in a compression map (CMAP) buffer 322. The compression information 312 may include a CMAP and/or other information indicating how the compressed weight values 311 were compressed through zero value compression. An example of a CMAP is shown in FIG. 4. The compression information 312 can be supplied by the system memory 305 and sent together with the compressed weight values 311. For example, the compression information 312 can be included in a header section of one or more data packages containing the compressed weight values 311. Alternatively, the compression information 312 could be sent from another component of the computing system, such as a host processor. Thus, compression information can be stored together with compressed data or sent separately.

In situations where the compressed weight values 311 have not been compressed using zero value compression, the zero value decompression unit 320 can simply forward the reassembled weight values 313 to the shared weight decompression unit 330 for decompression. Thus, the zero value decompression unit 320 can operate as a pass-through when zero value decompression does not need to be performed. Alternatively, in certain embodiments, the decompression unit 152 may include bypass logic that routes the reassembled weight values 313 to the shared weight decompression unit 330, skipping the zero value decompression unit 320 entirely. Similarly, the shared weight decompression unit 330 can forward the output of the zero value decompression unit 320 to the weight buffer 340, or the shared weight decompression unit 330 can be bypassed, when the compressed weight values 311 have not been shared weight compressed. The DME 150 can instruct the zero value decompression unit 320 and the shared weight decompression unit 330 as to whether to perform decompression, e.g., based on compression mode information supplied in a LOAD instruction (described below). Alternatively, each decompression unit may be configured to independently determine whether it needs to perform decompression, e.g., based on the contents of a control register that is set by the LOAD instruction to indicate which compression mode to use. The fully decompressed weight values 317, which are in a format compatible with the NNA 100 (e.g., INT8) may be sent to and stored by the weight buffer 340. The fully decompressed weight values 317 may be used during execution of the current machine learning model (and/or a layer or other portion thereof).

In an example where the NNA 100 uses 8-bit values, the 8-bit weights may be converted to indices in a programmable lookup table (or other data structure). The indices may be packed 5-bit values (or other sub-8-bit values depending on the particular quantization using during the S8BQAT). The decompression unit 152 may convert the indices to 8-bits for downstream processing by the NNA 100.

FIG. 4 depicts a table illustrating an accuracy and latency comparison between 8-bit quantization and sub-8-bit quantization aware training using the various techniques described herein for an ASR task. The performance metrics for ASR evaluation include word error rates (WER) and normalized user-perceived latency. P50 and P90 denote the 50% and 90% percentile latency for all utterances used in the test set. As shown, model M-III which uses 5-bit S8BQAT illustrates improved WER and reduced latency relative to the 8-bit model while increasing the number of model parameters. Accordingly, S8BQAT allows enhanced performance, larger models (if desired) for a given memory size, and reduced latency.

The experimental results depicted in FIG. 4 were determined for the ASR task using the Recurrent Neural Network-Transducer (RNN-T) architecture Several RNN-T variants were considered, and performance was compared against a linear quantization-aware training baseline method. Essentially, the proposed method differs from the baseline approach in two aspects: the soft compressor approximates Lloyd-Max scalar quantization to regularize model weights in a non-linear space while the hard compressor is introduced and invoked periodically to emulate runtime quantization.

Upon receiving the sub-8-bit model weights, the NNA 100 decompresses the weights to a format that is compatible with the hardware of the NNA 100 (INT8 8-bit format in many cases). FIG. 3 depicts an example decompression unit 152 of the NNA 100 in accordance with various aspects of the present disclosure.

Figure 5:
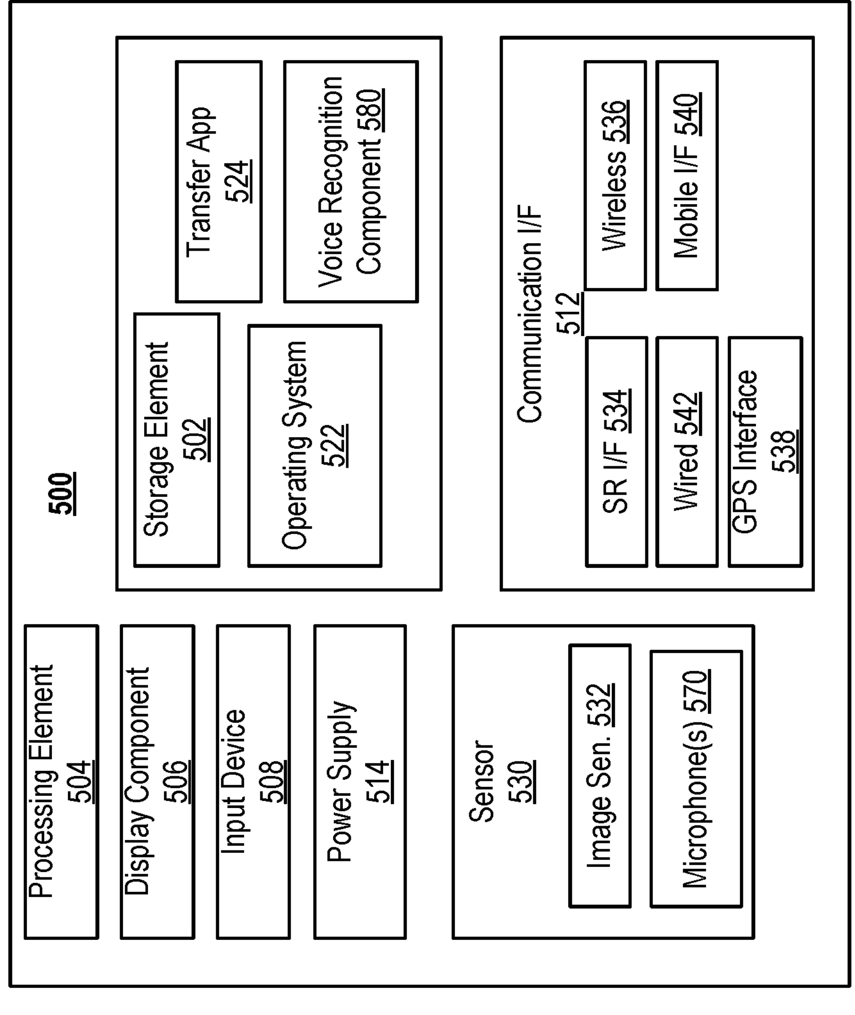
FIG. 5 is a block diagram showing an example architecture of a network-connected device that may be used in accordance with various aspects described herein.

FIG. 5 is a block diagram showing an example architecture 500 of a network-connected device that may be used to implement, at least in part, a speech processing-enabled device, the NNA architecture, and/or the machine learning model compression techniques described herein. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). In some examples, the processing element 504 may be effective to determine a wakeword and/or to stream audio data to a speech processing system. The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500. In some examples, the transfer application 524 may also be configured to send the received voice requests to one or more voice recognition servers.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display content determined provided by a skill executed by the processing element 504 and/or by another computing device. In some examples, the display component 506 and/or one or more speakers (not shown) may be effective to output an indication that unconsumed notifications (e.g., voice notifications) are pending. In some cases, there may be an indicator light effective to provide such an indication. In addition, speakers of the architecture 500 may output the voice notification audio upon receiving a user command to consume or "read" the voice notifications.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. Voice recognition component 580 may interpret audio signals of sound captured by microphone 570. In some examples, voice recognition component 580 may listen for a "wakeword" to be received by microphone 570. Upon receipt of the wakeword, voice recognition component 580 may stream audio to a voice recognition server for analysis, such as a speech processing system. In various examples, voice recognition component 580 may stream audio to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as a computer communication network, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. An example of an image sensor 532 may be a camera configured to capture color information, image geometry information, and/or ambient light information.

Figure 6:
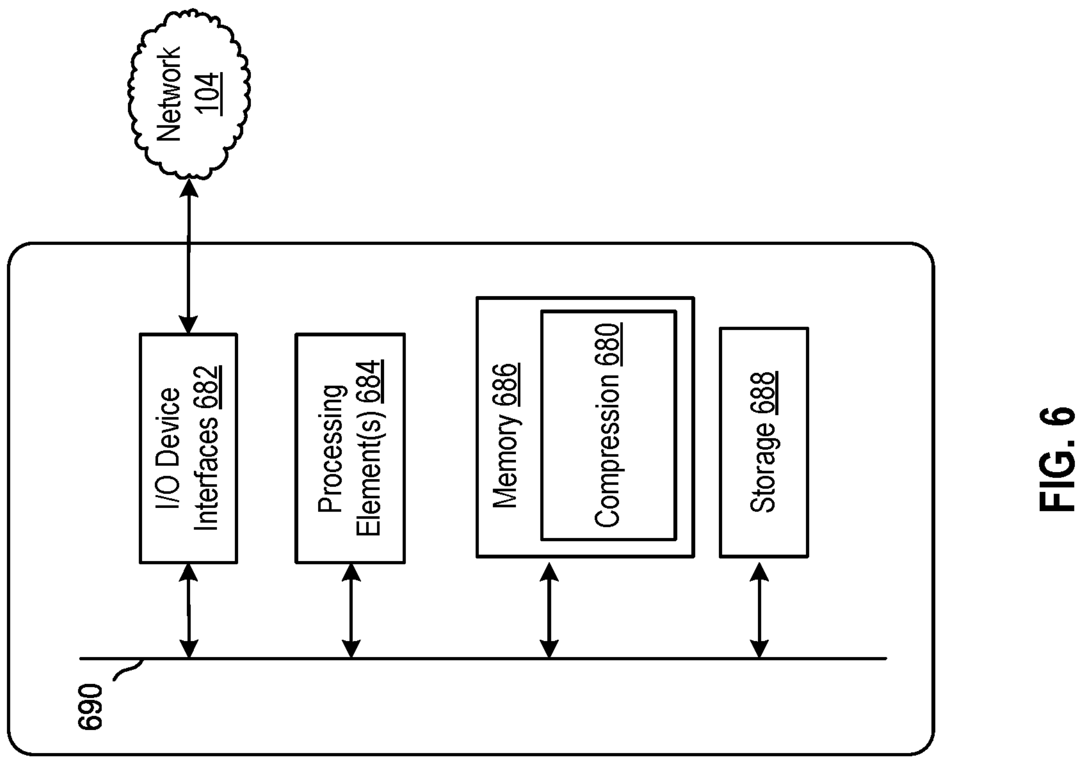
FIG. 6 is a block diagram showing an example architecture of computing devices that may be used in accordance with various aspects described herein.

FIG. 6 is a block diagram conceptually illustrating example components of a computing device, such as the natural language-processing computing device(s) 720 and/or another computing device(s) performing compression of machine learning models. In operation, each of these devices (or groups of devices) may include computer-readable and computer-executable instructions that reside on the respective device, as will be discussed further below.

Each computing device may include one or more controllers/processors 684, which may each include at least one central processing unit (CPU) for processing data and computer-readable instructions, and a memory 686 for storing data and instructions of the respective device. In at least some examples, memory 686 may store, for example, instructions effective to perform the various compression techniques described herein. Additionally, in various examples, compressed NLU models compressed using the various techniques described herein may be stored in memory 686. In various further examples, memory 686 may be effective to store instructions effective to program controllers/processors 684 to perform the various techniques described above in reference to FIGS. 1-5. Accordingly, in FIG. 6, compression 680 may represent the various compression techniques used to compress machine learning models that are described herein. Compression 680 is depicted as being stored within memory 686. In various examples, machine learning model training may be performed using compression 680 and the resulting machine learning model (including the sub-8-bit quantized weights) may be sent to edge computing devices where the compressed models may be executed and/or which comprise an NNA. The memories 686 may individually include volatile random access memory (RAM), non-volatile read only memory (ROM), non-volatile magnetoresistive memory (MRAM), and/or other types of memory. Each device may also include a data storage component 688 for storing data and controller/processor-executable instructions. Each data storage component 688 may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces 682.

Computer instructions for operating each device and its various components may be executed by the respective device's controllers/processors 684, using the memory 686 as temporary "working" storage at runtime. A device's computer instructions may be stored in a non-transitory manner in non-volatile memory 686 (e.g., a non-transitory computer-readable memory), storage 688, or an external device(s). Alternatively, some or all of the executable instructions may be embedded in hardware or firmware on the respective device in addition to or instead of software.

Each device may include input/output device interfaces 682. A variety of components may be connected through the input/output device interfaces 682, as will be discussed further below. Additionally, each device may include an address/data bus 690 for conveying data among components of the respective device. Each component within a device may also be directly connected to other components in addition to (or instead of) being connected to other components across the bus 690.

As noted above, multiple devices may be employed in a single system. In such a multi-device system, each of the devices may include different components for performing different aspects of the system's processing. The multiple devices may include overlapping components. The components of a natural language-processing computing device(s) 720, as described herein, are exemplary, and may be located as a stand-alone device or may be included, in whole or in part, as a component of a larger device or system. In various examples, the compression techniques described herein may be used to compress weights of the various machine learning models described in FIG. 7 (such as machine learning models used by ASR component 750 and/or natural language component 760. In various other examples, the compression techniques described herein may be used for wakeword detection and/or to compress any other type of machine learning model.

Figure 7:
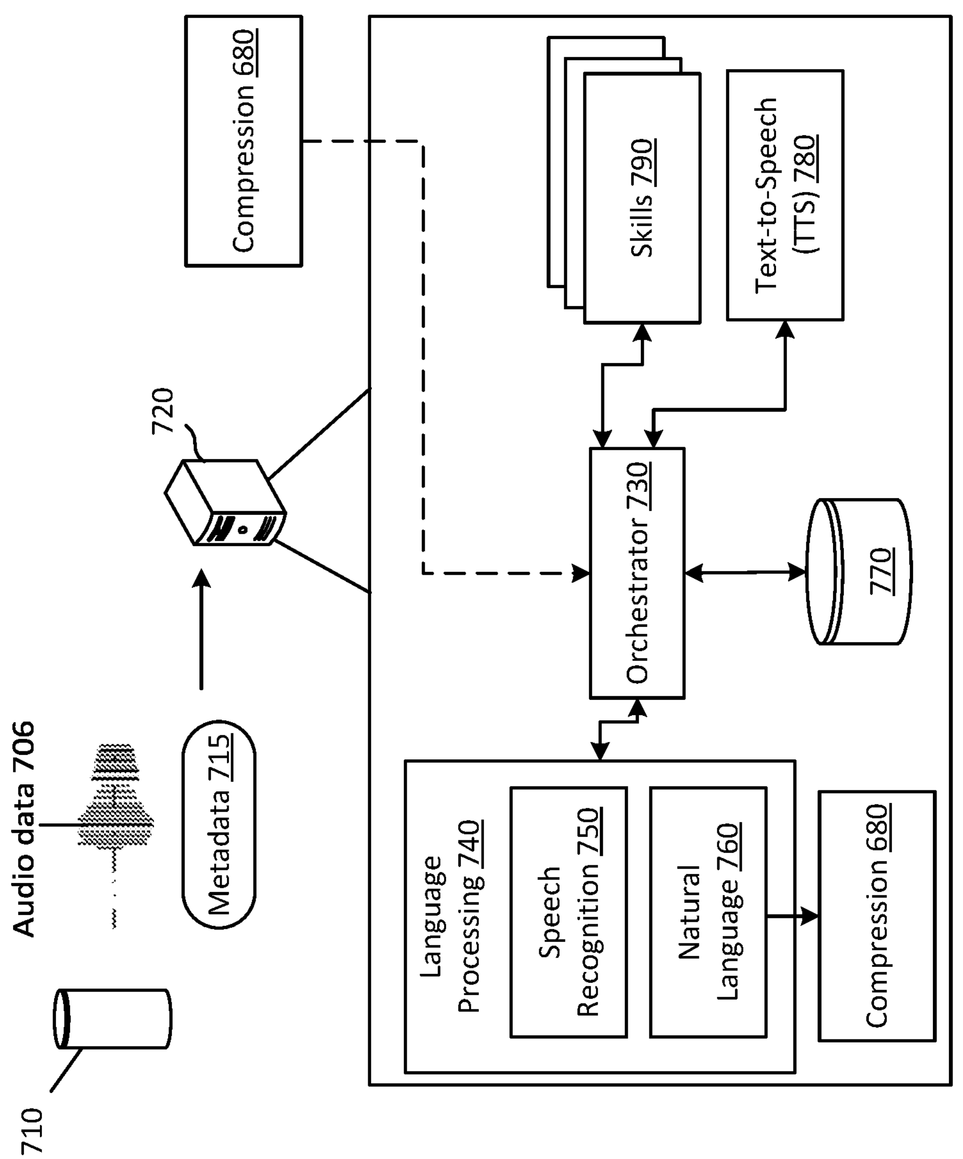
FIG. 7 is a conceptual diagram of components of a speech-processing device(s) according to various aspects of the present disclosure.

A system according to the present disclosure may operate using various components as described in FIG. 7. The various components illustrated FIG. 7 may be located on the same or different physical devices. Communication between various components illustrated in FIG. 7 may occur directly or across a network. In various examples, the compression techniques described herein and/or the NNA may be used in the context of natural language processing (NLP), as many NLP typically employs a multitude of machine learning models that may benefit from compression and/or hardware acceleration, as described herein. For example, in the context of ASR, each frame of audio data for a given input of audio data (e.g., a single spoken request) may result in the invocation of an ASR model causing the ASR model weights to be loaded from system memory into the memory of an NNA. There may be, for example, 30 frames (or some other number, depending on the example and/or the framerate) in a single audio input, resulting in 30 instances of the data moving operation and ASR model execution. Accordingly, the various compression techniques described herein may significantly reduce latency resulting from the ASR task (and, indeed may improve performance).

The natural language processing enabled device 710 may capture audio using an audio capture component. The natural language processing enabled device 710 may send audio data 706 (e.g., representing a spoken user request), corresponding to spoken audio, to the natural language-processing computing device(s) 720. The natural language processing enabled device 710 may include a wakeword detection component that detects when input audio includes a spoken wakeword. In some instances, the natural language processing enabled device 710 may be configured to send audio data 706 to the natural language-processing computing device(s) 720 when the natural language processing enabled device 710 detects a spoken wakeword. The natural language processing enabled device 710 may also send metadata 715 (e.g., including encoded states of natural language processing enabled device 710, timestamp data, etc.) to the natural language-processing computing device(s) 720. The metadata 715 may be created by a computing component of the natural language processing enabled device 710.

Upon receipt by the natural language-processing computing device(s) 720, the audio data 706 may be sent to an orchestrator 730. The orchestrator 730 may include memory and logic that enables the orchestrator 730 to transmit various pieces and forms of data to various components of the system. For example, orchestrator 730 may send NLU data to be compressed, ASR data to be compressed, etc.

The orchestrator 730 may send the audio data 706 to a language processing component 740. An ASR component 750 (e.g., a speech recognition component) of the language processing component 740 transcribes the audio data 706 into one or more hypotheses representing speech contained in the audio data 706. The ASR component 750 interprets the speech in the audio data based on a similarity between the characteristics of the audio data corresponding to the speech and pre-established language models. For example, the ASR component 750 may compare the audio data 706 with models for sounds (e.g., subword units such as phonemes) and sequences of sounds to identify words that match the sequence of sounds in the speech represented in the audio data 706. As previously described, ASR component 750 may include one or more machine learning models that may be compressed using the various techniques described herein (e.g., by compression 680 which may be conceptually grouped with the natural language-processing computing device(s) 720 or which may be a separate and/or remote system). The ASR component 750 may send text data generated thereby to a Natural language component 760 of the language processing component 740. The text data output by the ASR component 750 may include a top scoring hypothesis of the speech represented in the audio data 706 or may include an N-best list including a group of hypotheses of the speech represented in the audio data 706, and potentially respective scores ASR processing confidence scores.

The natural language component 760 attempts to make a semantic interpretation of the phrases or statements represented in the text data input therein. That is, the natural language component 760 determines one or more meanings associated with the phrases or statements represented in the text data based on individual words represented in the text data. The natural language component 760 interprets a text string to derive an intent of the user (e.g., an action that the user desires be performed) as well as pertinent pieces of information in the text data that allow a device (e.g., the natural language-processing computing device(s) 720, etc.) to complete the intent. For example, if the text data corresponds to "Play the new album by [Musical_Artist]", the natural language component 760 may determine the user intended to invoke a music playback intent with to play the relevant album. In various examples, the metadata 715 may be an indication of data displayed and/or output by natural language processing enabled device 710 and/or data related to a current device state of natural language processing enabled device 710. In various examples, the natural language component 760 may be compressed using the various compression techniques described herein (e.g., by compression 680). In at least some other examples, natural language component 760 may represent a compressed NLU model, compressed according to one or more of the various techniques described herein.

The natural language-processing computing device(s) 720 may include a profile storage 770. The profile storage 770 may include a variety of information related to individual users, groups of users, etc. that interact with the system. The user profile storage 770 may include one or more profiles. Each profile may be associated with a different identifier (ID), such as an identifier of natural language processing enabled device 710. A profile may be an umbrella profile specific to a group of users. That is, a profile encompasses two or more individual user profiles, each associated with a respective unique user ID. For example, a profile may be a household profile that encompasses user profiles associated with multiple users of a single household. Similarly, a profile may be associated with two or more users of a household and other speech-processing enabled devices of those users. A profile may include preferences shared by all the user profiles encompassed thereby. Each user profile encompassed under a single profile may include preferences specific to the user associated therewith. That is, each user profile may include preferences unique from one or more other user profiles encompassed by the same profile. A user profile may be a stand-alone profile or may be encompassed under a customer profile. As illustrated, the user profile storage 770 is implemented as part of the natural language-processing computing device(s) 720. However, it should be appreciated that the user profile storage 770 may be located proximate to the natural language-processing computing device(s) 720, or may otherwise be in communication with the natural language-processing computing device(s) 720, for example over a network(s).

The natural language-processing computing device(s) 720 may include one or more skills 790 configured to perform the various techniques herein disclosed, as well as other, processes. The natural language-processing computing device(s) 720 may also be in communication with one or more skill computing device(s) (not shown) that execute one or more skills configured to perform the herein disclosed, as well as other, processes. To enable a skill 790 to execute, orchestrator 730 may send output from the Natural language component 760 (e.g., text data including tags attributing meaning to the words and phrases represented in the text data), and optionally output from the profile storage 770 to the skill 790.

The natural language-processing computing device(s) 720 may also include a TTS component 780 that synthesizes speech (e.g., generates audio data) corresponding to text data input therein. The TTS component 780 may perform speech synthesis using one or more different methods. In one method of synthesis called unit selection, the TTS component 780 matches text data against one or more databases of recorded speech. Matching units are selected and concatenated together to form audio data. In another method of synthesis called parametric synthesis, the TTS component 780 varies parameters such as frequency, volume, and noise to create an artificial speech waveform output. Parametric synthesis uses a computerized voice generator, sometimes called a vocoder.

The various components (730/740/750/760/780/790) described above may exist in software, hardware, firmware, or some combination thereof.

In some examples, the natural language-processing computing device(s) 720 may reside on natural language processing enabled device 710, in a remote computing environment, or some combination thereof. For example, the natural language processing enabled device 710 may include computing equipment, some portion of which is configured with all/some of the components/functionality of natural language-processing computing device(s) 720 and another portion of which is configured with all/some of the components/functionality of one or more other computing devices.

The natural language processing enabled device 710 may then perform a variety of functions on its own (such as when remote communications are unavailable), and/or may communicate (when capable) with the natural language-processing computing device(s) 720 to perform other functions. Alternatively, all of the functionality may reside on the natural language processing enabled device 710 or remotely.

Figure 8:
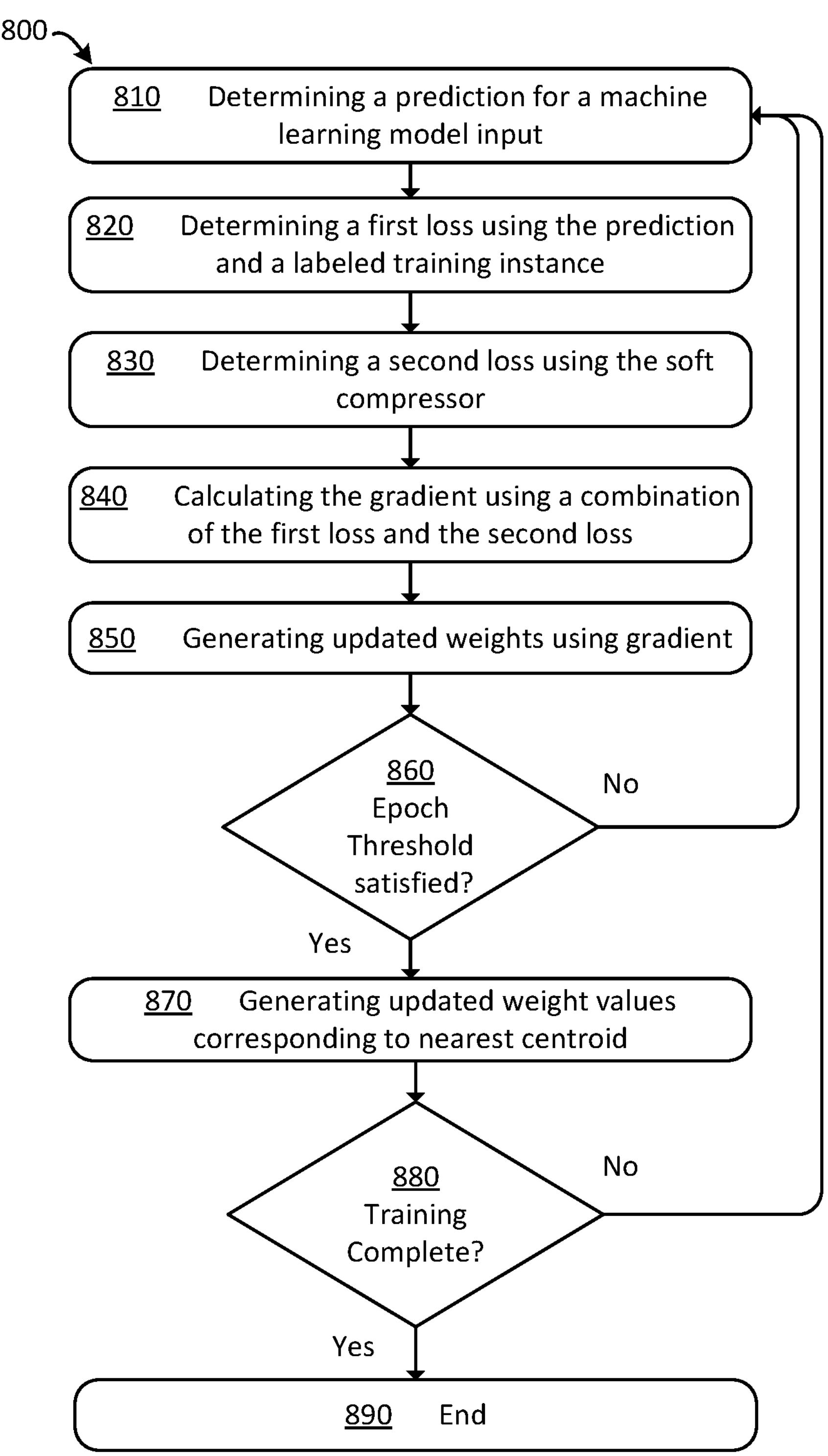
FIG. 8 is a process of sub-8-bit quantization aware training for machine learning models, in accordance with various aspects of the present disclosure.

FIG. 8 depicts a flow chart showing an example process 800 for compressing a machine learning model, in accordance with various aspects of the present disclosure. Those portions of FIG. 8 that have been previously discussed in reference to FIGS. 1-7 may not be described again for purposes of clarity and brevity. The actions of the process 800 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

In some examples, process 800 may begin at action 810, at which a prediction for a machine learning model input may be generated. For example, an input from a labeled training sample may be input into the machine learning model being trained (after initialization). For example, for an ASR model, the input may be a data representation of audio (e.g., human speech). The model may generate ASR output data (e.g., text) representing a prediction of a word or words present in the audio.

Processing may continue at action 820, at which a first loss may be determined using the prediction and a labeled training instance. For example, the prediction (e.g., the predicted output) may be compared to a ground truth label (e.g., a ground truth output) to determine a numerical representation of a difference between the two (e.g., L1 loss, L2 loss, etc.).

Processing may continue at action 830, at which a second loss may be determined using the soft compressor. For example, the regularization loss described above in reference to FIG. 2B may be determined for each weight value of the current weight values of the model. At action 840, the gradient for the weights may be calculated. The gradient of the soft compressor is described above (e.g., Eqn. 2). The gradient of the loss function used at action 820 depends on the particular loss function being used. The combination of the first loss and the second loss (first ("soft") compressor 218 regularization loss) may be used to calculate the weight gradients. The weights may be updated using the gradient at action 850.

At action 860, a determination may be made of the number of training epochs currently completed. An epoch refers to training the machine learning model with all the designated training data (which may be one or more batches of the training set) one time. In other words, the designated set of training data is used during a forward pass (to determine model output (e.g., prediction values)). Loss may be calculated for the model output using the relevant loss functions (e.g., by comparing the model output for a given training instance to the ground truth label for that training instance). During a backward pass, the gradient may be determined as the derivative of the loss function(s) and may be used to modify the weights in a way that will decrease the loss. An epoch comprises a single forward pass and backward pass of all the training data (whether or not it is first separated into batches). The number of training epochs may be determined using any desired model training software. If the threshold number of epochs has not yet been satisfied, processing may return to action 810 and the next epoch and/or iteration may begin. The threshold may be empirically determined. If the epoch threshold has been reached, processing may continue to action 870, at which the weight values may be updated using second ("hard") compressor 222. For example, each weight may be updated to be the value of the closest centroid value (which is INT8, or other desired format, compatible). This update comprises replacing the current weight value with the value of the closest centroid. Processing may continue to action 880 at which a determination may be made if training is complete (e.g., training may stop when loss begins to increase (e.g., when the loss moves away from a local minimia)). If training is not yet complete, processing may return to action 810. If training is completed, the process may end at action 890 and the learned, quantized model weights may be stored. For example, the model weights may be stored in sub-8-bit format (e.g., 5 bits, or fewer). The quantized weights are able to be decompressed into the desired NNA-compatible format (e.g., 8-bit) without loss of model performance, as described above.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon applying one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or other type of application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A machine learning method comprising:

determining a target number of bits b for representing one or more weight values of a machine learning model;

determining regions r, wherein a first region of the regions r comprises an interval of numbers and has an associated centroid value of k/128, in which $k \in [-128, 127]$;

determining a first weight value $w_i$ of the machine learning model, the first weight value $w_i$ being included in the interval of numbers of the first region;

determining a first loss value for the first weight value $w_i$ using $1-|\cos(\pi\theta_r w_i)|$, wherein $\theta_r$ represents a frequency of a cosine function in the first region, and where $\theta=2^n$ and $n \in [1, 2, 3, 4, 5, 6, 7, 8]$;

determining a first compressed weight value $w_i$ of the one or more weight values by updating the first weight value $w_i$ using the first loss value; and storing a compressed representation of the machine learning model comprising the first compressed weight value $w_i$ in a first memory.

2. The method of claim 1, further comprising:

determining the first compressed weight value $w_i$ after a first number of training epochs;

determining that at least the first number of training epochs has been satisfied; and generating, in response to the first number of training epochs having been satisfied, a second compressed weight value $w_i$ by updating the first compressed weight value $w_i$ to the second compressed weight value $w_i$, wherein the second compressed weight value $w_i$ corresponds to a nearest centroid value to the first compressed weight value $w_i$ among a plurality of centroid values.

3. The method of claim 2, further comprising:

storing the second compressed weight value $w_i$ in the first memory in a first format that uses the target number of bits b;

receiving instructions to load weight values of the machine learning model into a second memory associated with a neural network accelerator chip;

sending the second compressed weight value $w_i$ in the first format to the neural network accelerator chip; and decompressing the second compressed weight value $w_i$ from the first format to an 8-bit integer format (INT8) compatible with hardware of the neural network accelerator chip.

4. A method comprising:

determining a first weight value $w_i$ of a machine learning model;

determining a first loss for the first weight value $w_i$ using a first loss function comprising a weighting term comprising a sinusoid function with an argument of $\pi\theta_r w_i$, wherein θ is selected such that a maximum magnitude of the weighting term corresponds to a centroid value of a first format compatible with a first machine learning accelerator;

determining a gradient of the first loss function;

determining a first compressed weight value $w_i$ using the gradient and the first loss; and storing the first compressed weight value $w_i$ in a first memory.

5. The method of claim 4, further comprising selecting θ such that $\theta=2^n$, where $n \in [1, 2, 3, 4, 5, 6, 7, 8]$.

6. The method of claim 4, further comprising:

determining the first compressed weight value $w_i$ after a first number of training epochs; and generating, after the first number of training epochs, a second compressed weight value $w_i$ by replacing the first compressed weight value $w_i$ with the centroid value.

7. The method of claim 4, further comprising:

storing a first set of weights comprising the first compressed weight value $w_i$ in the first memory in a second format using less than eight bits per weight;

receiving a request to execute the machine learning model;

sending the first set of weights to the first machine learning accelerator, wherein the first machine learning accelerator is compatible with the first format using a different number of bits per weight; and determining, for the first compressed weight value $w_i$ of the first set of weights, a corresponding second compressed weight value $w_i$ in the first format using a lookup operation.

8. The method of claim 4, the method further comprising determining the first loss based at least in part on a difference between a value of the weighting term and the centroid value.

9. The method of claim 8, further comprising:

determining, after a threshold number of training epochs, a first centroid value using a current value of the first compressed weight value $w_i$, and generating, after the threshold number of training epochs, a second compressed weight value $w_i$ by replacing the first compressed weight value $w_i$ with the first centroid value.

10. The method of claim 4, further comprising:

receiving input audio data;

determining a framerate of the input audio data comprising a first number of frames per second;

loading the machine learning model comprising the first compressed weight value $w_i$ into a second memory of machine learning accelerator for at least a first frame of the first number of frames; and generating a second compressed weight by replacing the first compressed weight $w_i$ with a decompressed value stored in association with the first compressed weight $w_i$ in a data structure, wherein the second compressed weight is in a format compatible with the machine learning accelerator.

11. The method of claim 4, further comprising:

determining a second loss representing a difference between a predicted output of the machine learning model for a first input and a ground truth output for the first input;

processing the first loss and the second loss to generate a combined loss; and determining the first compressed weight value $w_i$ at least in part by minimizing the combined loss.

12. The method of claim 4, further comprising:

multiplying the first loss by a parameter $\delta_r$, where parameter $\delta_1=1$ for a first region comprising an interval of numbers when the first weight value $w_i$ is included in the interval of numbers, and parameter $\delta_1=0$ when the first weight value $w_i$ is outside the interval of numbers.

13. A system, comprising:

at least one processor; and at least one non-transitory computer-readable memory storing instructions that, when executed by the at least one processor, are effective to:

determine a first weight value $w_i$ of a machine learning model;

determine a first loss for the first weight value $w_i$ using a first loss function comprising a weighting term comprising a sinusoid function with an argument of $\pi\theta^r w_i$, wherein $\theta$ is selected such that a maximum magnitude of the weighting term corresponds to a centroid value of a first format that is compatible with a first machine learning accelerator;

determine a gradient of the first loss function;

determine a first compressed weight value $w_i$ using the gradient and the first loss; and store the first compressed weight value $w_i$ in a first memory.

14. The system of claim 13, the at least one non-transitory computer-readable memory storing further instructions that, when executed by the at least one processor, are further effective to select $\theta$ such that $\theta=2^n$, where $n\in[1, 2, 3, 4, 5, 6, 7, 8]$.

15. The system of claim 13, the at least one non-transitory computer-readable memory storing further instructions that, when executed by the at least one processor, are further effective to:

determine the first compressed weight value $w_i$ after a first number of training epochs; and generate, after the first number of training epochs, a second compressed weight value $w_i$ by replacing the first compressed weight value $w_i$ with the centroid value.

16. The system of claim 13, the at least one non-transitory computer-readable memory storing further instructions that, when executed by the at least one processor, are further effective to:

store a first set of weights comprising the first compressed weight value $w_i$ in the first memory in a second format using less than eight bits per weight;

receive a request to execute the machine learning model;

send the first set of weights to the first machine learning accelerator, wherein the first machine learning accelerator is compatible with the first format using a different number of bits per weight; and determine, for the first compressed weight value $w_i$ of the first set of weights, a corresponding second compressed weight value $w_i$ in the second format using a lookup operation.

17. The system of claim 13, the at least one non-transitory computer-readable memory storing further instructions that, when executed by the at least one processor, are further effective to determine the first loss based at least in part on a difference between a value of the weighting term and the centroid value.

18. The system of claim 17, the at least one non-transitory computer-readable memory storing further instructions that, when executed by the at least one processor, are further effective to:

determine, after a threshold number of training epochs, a first centroid value using a current value of the first compressed weight value $w_i$, and generate, after the threshold number of training epochs, a second compressed weight value $w_i$ by replacing the first compressed weight value $w_i$ with the first centroid value.

19. The system of claim 13, the at least one non-transitory computer-readable memory storing further instructions that, when executed by the at least one processor, are further effective to:

receive input audio data;

determine a framerate of the input audio data comprising a first number of frames per second;

load the machine learning model comprising the first compressed weight value $w_i$ into a second memory of machine learning accelerator for at least a first frame of the first number of frames; and generate a second compressed weight by replacing the first compressed weight $w_i$ with a decompressed value stored in association with the first compressed weight $w_i$ in a data structure, wherein the second compressed weight is in a format compatible with the machine learning accelerator.

20. The system of claim 13, the at least one non-transitory computer-readable memory storing further instructions that, when executed by the at least one processor, are further effective to:

determine a second loss representing a difference between a predicted output of the machine learning model for a first input and a ground truth output for the first input;

combine the first loss and the second loss to generate a combined loss; and determine the first compressed weight value $w_i$ at least in part by minimizing the combined loss.

* * * * *